(12) United States Patent
Ichinohe

(10) Patent No.: US 8,189,480 B2
(45) Date of Patent: May 29, 2012

(54) COMMUNICATION APPARATUS AND COMMUNICATION METHOD

(75) Inventor: Toshiyuki Ichinohe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 517 days.

(21) Appl. No.: 12/432,840

(22) Filed: Apr. 30, 2009

(65) Prior Publication Data

US 2009/0316617 A1    Dec. 24, 2009

(30) Foreign Application Priority Data

Jun. 19, 2008   (JP) .................................. 2008-160064

(51) Int. Cl.
*H04W 4/00* (2009.01)
(52) U.S. Cl. ........................................ 370/236; 370/351
(58) Field of Classification Search .................. 370/236, 370/236.1, 236.2, 252, 253, 254, 255, 401, 370/351
See application file for complete search history.

(56) References Cited

U.S. PATENT DOCUMENTS

| 2004/0162061 A1* | 8/2004 | Abrol et al. ................ 455/414.1 |
| 2005/0268150 A1* | 12/2005 | Llabres et al. ..................... 714/4 |
| 2010/0142435 A1* | 6/2010 | Kim et al. ..................... 370/315 |

FOREIGN PATENT DOCUMENTS

JP    2006-211545    8/2006

\* cited by examiner

*Primary Examiner* — Gary Mui
(74) *Attorney, Agent, or Firm* — Myers Wolin, LLC

(57) ABSTRACT

In a communication apparatus performing data communication through a network having a relay apparatus which relays data, a data-path establishment unit establishes a data-communication path between the communication apparatus and an opposite end of the data-communication path, and a control-path establishment unit establishes a control-information path between the communication apparatus and an opposite end of the control-information path, where the control-information path is arranged for transmitting control information for controlling the data communication through the control-information path. In addition, an instruction transmission unit transmits an address-set instruction instructing the relay apparatus to search for a next-hop node in the data-communication path and store a MAC address of the next-hop node before the control-information path is established by the control-path establishment unit.

8 Claims, 12 Drawing Sheets

ADDRESS TABLE

| NODE NAME | IP ADDRESS | MAC ADDRESS |
|---|---|---|
| WIRELESS BASE STATION APPARATUS | ⟨IPa⟩.a1 | x1 |
| ROUTER A | ⟨IPa⟩.a2 | x2 |
| | ⟨IPb⟩.b1 | x3 |
| ROUTER B | ⟨IPb⟩.b2 | x4 |
| | ⟨IPc⟩.c1 | x5 |
| GATEWAY APPARATUS | ⟨IPc⟩.c2 | x6 |

FIG. 10

COMMUNICATION APPARATUS AND COMMUNICATION METHOD

CROSS-REFERENCE TO RELATED APPLICATIONS

This application is based on and claims the benefits of priority of the prior Japanese Patent Application No. 2008-160064, filed on Jun. 19, 2008, the contents of which are incorporated herein by reference.

FIELD

The embodiment discussed herein is related to a communication apparatus and a communication method.

BACKGROUND

Currently, Evolved UTRA and UTRAN are under study as a next generation mobile telephone system in the ahead of 3GPP (3rd Generation Partnership Project), where UTRA and UTRAN stand for UMTS Terrestrial Radio Access and UMTS Terrestrial Radio Access Network, respectively, and UMTS stands for Universal Mobile Telecommunications System. According to Evolved UTRA and UTRAN, wireless base station apparatuses and gateway apparatuses are connected through an IP (Internet Protocol) network. In the case where Ethernet is used for establishing physical links which realize the connections through the IP network, the MAC address resolution is performed by using ARP (Address Resolution Protocol).

In the case where MAC address resolution is performed by use of ARP, IP packets are temporarily buffered before being transmitted. Therefore, the MAC address resolution by use of ARP can cause loss or delay in transmission of IP packets.

In the W-CDMA (Wideband Code Division Multiple Access) mobile telephone system, which is one of the conventional wireless communication systems, the main data-plane traffic is non-real time traffic even Ethernet is used in the IP network. Therefore, it is possible to consider that the data-plane traffic is not significantly affected by the MAC address resolution by use of ARP. However, the real-time traffic of streaming of voice, large-capacity movie, or the like is greatly affected by the MAC address resolution by use of ARP.

Consider the case where the MAC address, for a call, of a call connection device or a router in an IP route in the data plane is unlearned immediately after call connection in the control plane. In such a case, an operation for learning a MAC address is performed in each node before user traffic in the data plane is started. Specifically, MAC address resolution by use of ARP is performed when the user traffic in the data plane is started.

Since buffering of IP packets occurs in the user traffic through each node, loss or delay in transmission of packets occur in the user traffic.

Further, in the case where an L2 switch has not learned of the MAC addresses in a route for a call although routers in the route have already learned of the MAC addresses, the L2 switch performs flooding, in which IP packets are transmitted through all ports except reception ports. Therefore, network resources which are irrelevant to the call are consumed, i.e., loss of network resources occurs.

A known call-connection terminating device acquires a next-hop IP address corresponding to the IP address in the current hop, and performs ARP resolution for the next-hop IP address in advance. (See, for example, Japanese Laid-open Patent Publication No. 2006-211545.)

However, the technique disclosed in Japanese Laid-open Patent Publication No. 2006-211545 may not able to be applied to communication systems using a control plane and a data plane in which different IP routes can be arranged. Such communication systems include the mobile communication systems for mobile telephone using the W-CDMA or other protocols, the IP telephone systems using SIP (Session Initiation Protocol), MEGP (MEdia Gateway Control Protocol), or the like, and the real-time communication systems in accordance with H.323.

SUMMARY

According to an aspect of the embodiment, a communication apparatus performing data communication through a network including a relay apparatus which relays data is provided. The communication apparatus includes: a data-path establishment unit which establishes a data-communication path between the communication apparatus and an opposite end of the data-communication path; and a control-path establishment unit which establishes a control-information path between the communication apparatus and an opposite end of the control-information path, where the control-information path is arranged for transmitting control information for controlling the data communication through the control-information path; wherein the data-path establishment unit includes an instruction transmission unit which transmits an address-set instruction instructing the relay apparatus to search for a next-hop node in the data-communication path and store a MAC address of the next-hop node before the control-information path is established by the control-path establishment unit.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 10 indicates an address table which indicates IP addresses and MAC addresses of respective nodes.

DESCRIPTION OF EMBODIMENT(S)

An embodiment of the present invention will be explained below with reference to the accompanying drawings.

1. Outline of System

Figure 1:
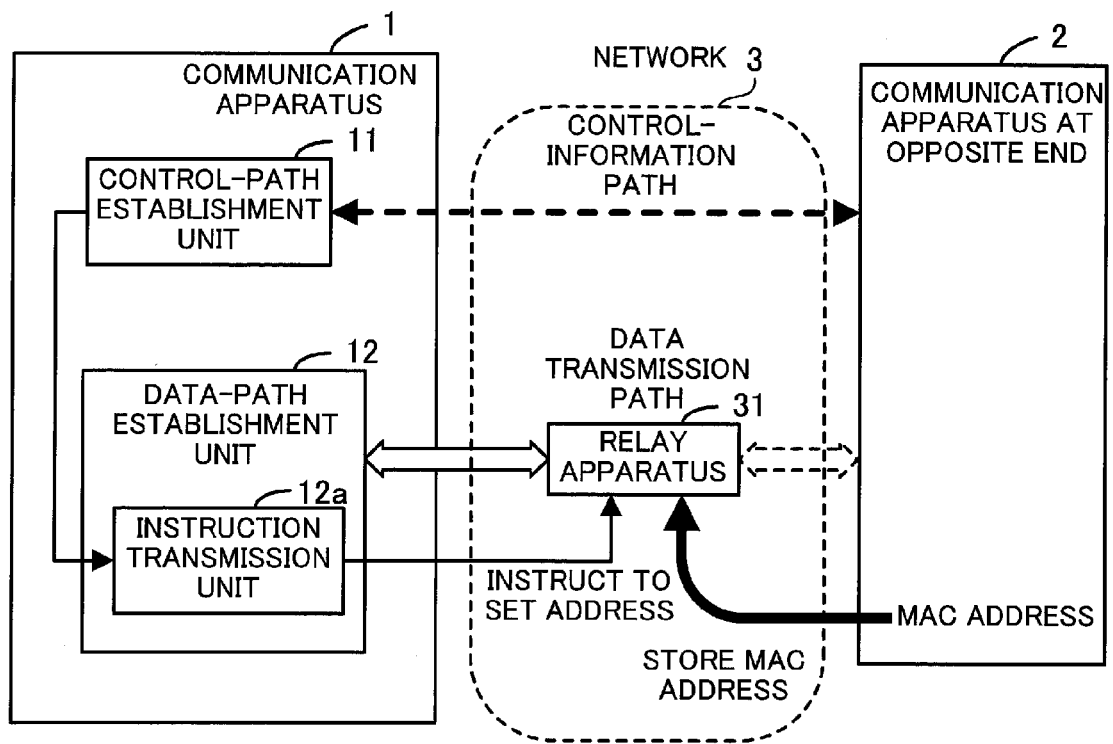
FIG. 1 is a diagram illustrating an outline of an embodiment.

FIG. 1 is a diagram illustrating an outline of an embodiment. The communication apparatus 1 illustrated in FIG. 1 is connected to a network 3 having a relay apparatus 31, and is connected through the network 3 to another communication apparatus 2. The communication apparatus 1 performs data communication through the network 3. The relay apparatus 31 stores a MAC address of a next-hop node, and relays data. The next-hop node is a node to which data is to be forwarded next. The communication apparatus 1 comprises a control-path establishment unit 11 and a data-path establishment unit 12. The data-path establishment unit 12 comprises an instruction transmission unit 12a, which is provided for transmitting an address-set instruction.

The control-path establishment unit 11 establishes a control-information path for control information through the network 3 between the communication apparatus 1 and an opposite end of the control-information path. When the control-information path is established, the data communication performed through a data transmission path between the communication apparatuses 1 and 2 can be controlled on the basis of the control information transmitted through the control-information path between the communication apparatuses 1 and 2.

The data-path establishment unit 12 establishes the data transmission path for data communication through the network 3 between the communication apparatus 1 and an opposite end of the data transmission path. That is, after the data transmission path is established, data communication can be performed between the communication apparatuses 1 and 2.

Before the control-path establishment unit 11 completes the establishment of the control-information path, the instruction transmission unit 12a transmits the address-set instruction, which instructs the relay apparatus 31 to search for a next-hop node in the data transmission path and store an MAC address of the next-hop node. The next-hop node may be another node in the network 3 or the communication apparatus 2.

The address-set instruction contains the IP address of the communication apparatus 2. When the relay apparatus 31 receives the address-set instruction, the relay apparatus 31 searches for the next-hop node on the basis of the IP address of the communication apparatus 2.

In the communication apparatus 1 having the above construction, the data-path establishment unit 12 establishes a data transmission path between the communication apparatus 1 and the opposite end of the data transmission path, the control-path establishment unit 11 establishes a control-information path between the communication apparatus 1 and the opposite end of the control-information path, and the instruction transmission unit 12a transmits the address-set instruction, which instructs the relay apparatus 31 to search for a next-hop node and store an MAC address of the next-hop node, before the control-path establishment unit 11 completes the establishment of the control-information path.

Therefore, the MAC address resolution in the data transmission path between the communication apparatuses 1 and 2 can be achieved before completion of call connection, so that it is possible to stabilize the user traffic in the data transmission path immediately after the call connection.

2. Details of Embodiment

Herein below, the embodiment is explained in detail with reference to FIGS. 2 to 12.

2.1 System Configuration

Figure 2:
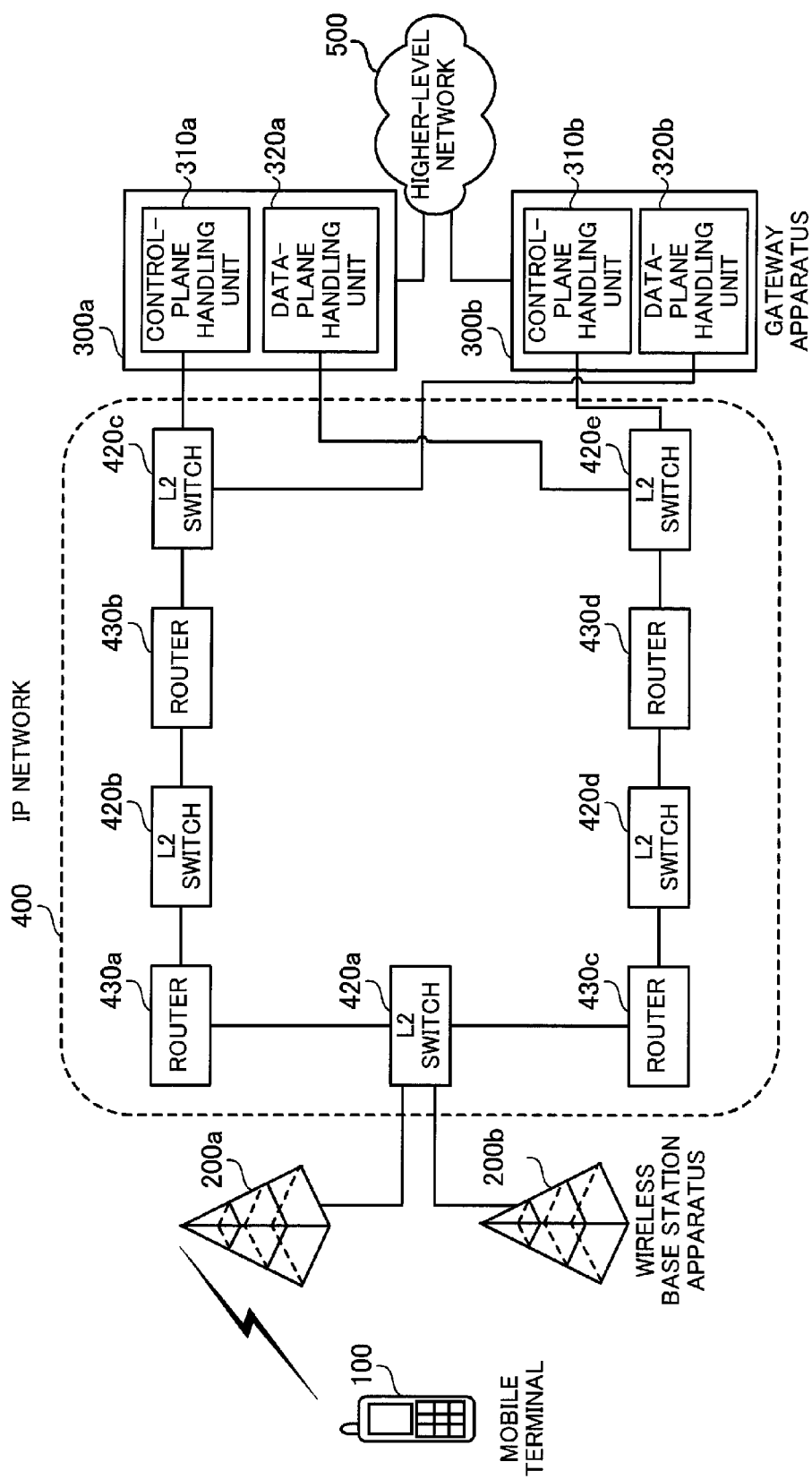
FIG. 2 is a diagram illustrating an exemplary system configuration according to the embodiment.

FIG. 2 is a diagram illustrating an exemplary system configuration of the mobile communication system according to the embodiment. The mobile communication system of FIG. 2 comprises a mobile terminal 100, wireless base station apparatuses 200a and 200b, gateway apparatuses 300a and 300b, an IP network 400, and a higher-level network 500. In the mobile communication system of FIG. 2, the mobile terminal 100 performs communication with another mobile terminal (not illustrated) through the wireless base station apparatuses 200a and 200b.

The wireless base station apparatuses 200a and 200b and the gateway apparatuses 300a and 300b are interconnected through the IP network 400, and the gateway apparatuses 300a and 300b are connected to the higher-level network 500.

In the mobile communication system according to the present embodiment, a plurality of wireless base station apparatuses (e.g., the wireless base station apparatuses 200a and 200b) and a plurality of gateway apparatuses (e.g., the gateway apparatuses 300a and 300b) realize a service area, and enables communication between mobile terminals and between a mobile terminal and a terminal in a fixed-line network (not illustrated) by exchanging wireless signals with mobile terminals.

The wireless base station apparatuses and the gateway apparatuses are interconnected by IP over Ethernet. Each of the gateway apparatuses comprises a control-plane handling unit (e.g., the control-plane handling unit 310a in the gateway apparatus 300a or the control-plane handling unit 310b in the gateway apparatus 300b) and a data-plane handling unit (e.g., the data-plane handling unit 320a in the gateway apparatus 300a or the data-plane handling unit 320b in the gateway apparatus 300b), and has an IP address of the control-plane handling unit and an IP address of the data-plane handling unit. Although the configuration of the IP network used in the mobile communication system according to the present embodiment is not limited as long as the IP connectivity is maintained, in order to clarify the object, the present embodiment is explained by taking an example in which the IP network is configured in such a manner that the IP route in the control plane (the control-information path) is different from the IP route in the data plane (the data transmission path).

The mobile terminal 100 is a wireless terminal which can perform wireless communication with the wireless base station apparatuses 200a and 200b, and is called a UE (user equipment). Although only the mobile terminal 100 operates in the explained example, more than one mobile terminal can concurrently perform communication in the mobile communication system according to the present embodiment.

Figure 3:
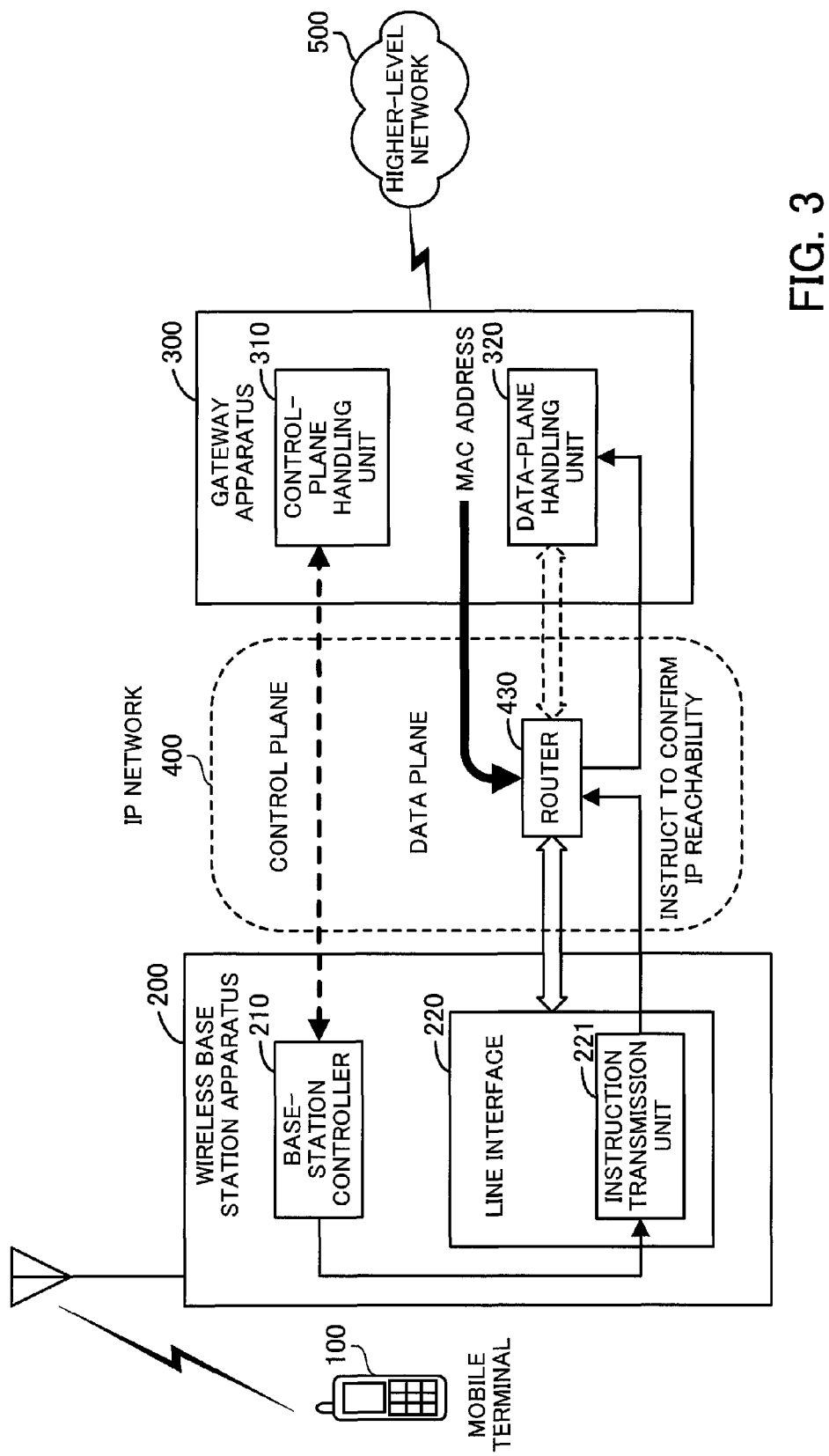
FIG. 3 is a block diagram of a wireless base station apparatus according to the embodiment.

The wireless base station apparatuses 200a and 200b are communication apparatuses which can perform wireless communication with the mobile terminal 100. The wireless base station apparatuses 200a and 200b have identical constructions and functions with the wireless base station apparatus 200, which are explained later with reference to FIG. 3. In FIG. 3, the wireless base station apparatuses 200a and 200b are representatively illustrated as the wireless base station apparatus 200.

When either of the wireless base station apparatuses 200a and 200b wirelessly receives data from the mobile terminal 100, the wireless base station apparatus transmits the received data to the gateway apparatus 300a or 300b through the IP network 400. Although the two wireless base station apparatuses 200a and 200b are used for realizing a service area in the explained example, only one wireless base station apparatus or more than two wireless base station apparatuses may be used for realizing a service area in the mobile communication system according to the present embodiment.

The gateway apparatuses 300a and 300b control the wireless base station apparatuses 200a and 200b, and forward data. The gateway apparatuses 300a and 300b have identical constructions and functions with the gateway apparatus 300, which are explained later with reference to FIG. 3. In FIG. 3, the gateway apparatuses 300a and 300b are representatively illustrated as the gateway apparatus 300.

The IP network 400 is a network which connects the wireless base station apparatuses 200a and 200b and the gateway apparatuses 300a and 300b, and relays data between the wireless base station apparatuses 200a and 200b and the gateway apparatuses 300a and 300b. L2 switches 420a, 420b, 420c, 420d, and 420e and routers 430a, 430b, 430c, and 430d are arranged in the IP network 400. The routers 430a, 430b, 430c, and 430d have identical constructions and functions with the router 430, which are explained later with reference to FIG. 3. In FIG. 3, the routers 300a and 300b are representatively illustrated as the router 430.

The higher-level network 500 is a network which relays data between the gateway apparatuses 300a and 300b and other gateway apparatuses (not illustrated).

Although the present embodiment is explained by taking an example of the mobile communication system in which data such as voice data of mobile telephone is transmitted, the present embodiment is not limited to such a communication system. For example, the scope of the embodiment includes the communication systems in which the links for data transmission are always different from the links for transmission of control information for controlling the links for the data transmission, and the communication systems in which the links for data transmission can be sometimes different from the links for transmission of control information for controlling the links for the data transmission. In such cases, the communication apparatus according to the present embodiment is configured to realize the above communication systems.

2.2 Wireless-Base-Station Device

The aforementioned wireless base station apparatus 200 as the representative of the plurality of wireless base station apparatuses in the mobile communication system according to the present embodiment is explained below. FIG. 3 illustrates the wireless base station apparatus 200. The wireless base station apparatus 200 performs data communication through the IP network 400, which comprises a router 430. The router 430 stores a MAC address of the next-hop node, and relays data. The wireless base station apparatus 200 of FIG. 3 comprises a base-station controller 210 and a line interface 220. The line interface 220 comprises an instruction transmission unit 221.

The wireless base station apparatus 200 is connected to the IP network 400, and the mobile terminal 100 can be connected to the wireless base station apparatus 200. The wireless base station apparatus 200 performs data communication with the gateway apparatus 300 (which is the aforementioned gateway apparatus as the representative of the plurality of gateway apparatuses) through the IP network 400.

The mobile terminal 100 can be connected to the gateway apparatus 300 through the wireless base station apparatus 200 and the IP network 400, so that the mobile terminal 100 can perform communication through the gateway apparatus 300 with another apparatus (not illustrated).

Although the present embodiment is explained by taking an example of the mobile communication system in which the mobile terminal 100 performs data communication by W-CDMA, alternatively, the mobile communication system according to the present embodiment may use other communication technologies. Further, since the voice data is mainly transmitted in the explained example, the data communication in the explained example is real-time communication.

In order to perform MAC address resolution in the data transmission path (in the data plane), which is controlled by use of the control-information path (in the control plane), the wireless base station apparatus 200 has the following functions.

The base-station controller 210 in the wireless base station apparatus 200 establishes a control-information path (in the control plane) between the base-station controller 210 and the control-plane handling unit 310 in the gateway apparatus 300 through the IP network 400. The control-plane handling unit 310 is at the opposite end of the control-information path. When the control plane is established, control information for controlling data communication in the data plane can be transmitted through the control plane between the wireless base station apparatus 200 and the gateway apparatus 300, so that the data communication performed between the wireless base station apparatus 200 and the gateway apparatus 300 can be controlled on the basis of the control information.

In order to establish the control plane between the base-station controller 210 and the control-plane handling unit 310, the base-station controller 210 transmits toward the opposite end of the control-information path a request for establishment of the control plane, as explained later with reference to FIG. 4 (S12) and FIG. 7 (S102).

The line interface 220 in the wireless base station apparatus 200 establishes a data transmission path (in the data plane) between the line interface 220 and the data-plane handling unit 320 in the gateway apparatus 300 through the IP network 400. The data-plane handling unit 320 is at the opposite end of the data transmission path. When the data plane is established, data can be transmitted through the data plane established between the wireless base station apparatus 200 and the gateway apparatus 300.

The instruction transmission unit 221 transmits to the router 430 in the IP network 400 an instruction to confirm IP reachability (which corresponds to the aforementioned address-set instruction) before the establishment of the control plane is completed in response to the request for establishment of the control plane which is transmitted from the base-station controller 210. The instruction to confirm IP reachability instructs the router 430 to search for a next-hop node and store an MAC address of the next-hop node, and instructs the next-hop node to store the IP address of the router 430. The next-hop node may be another node in the IP network 400 or the gateway apparatus 300.

The instruction to confirm IP reachability (i.e., the address-set instruction) contains the IP address of the gateway apparatus 300. When the router 430 receives the address-set instruction, the router 430 searches for the next-hop node on the basis of the IP address of the gateway apparatus 300. In addition, the transmission of the instruction to confirm IP reachability is realized by ping transmission (i.e., transmission of an ICMP echo request (ping packet)), where ICMP stands for Internet Control Message Protocol. When the ICMP echo request reaches the gateway apparatus 300, the gateway apparatus 300 returns a ping reply (i.e., an ICMP echo reply) which indicates that the reachability has been confirmed.

The operations for establishing the control plane by the base-station controller 210 and the operations for establishing the data plane by the line interface 220 are concurrently performed. Therefore, the operations for connection in the data plane early starts, so that the data plane can be established early.

The data communication performed in the mobile communication system according to the present embodiment may be IP telecommunication using SIP (Session Initiation Protocol), MEgp (MEdia Gateway Control Protocol), or the like, and other real-time communication in accordance with, for example, H.323.

In addition, although the data communication performed in the explained example is mobile telecommunication in accordance with W-CDMA, the explained technique can be applied to other mobile communication systems in which the route of the control-information path in the control plane is different from the route of the data transmission path in the data plane.

Alternatively, the base-station controller 210 may establish the control plane on receipt of a request for establishment of the control plane which is transmitted from the opposite end of the control-information path to be established. In this case, when the base-station controller 210 receives the request for establishment of the control plane, the instruction transmission unit 221 transmits the instruction to confirm IP reachability to an opposite end of a data transmission path to be established, before the control plane is established.

Further, although the control-plane handling unit 310 and the data-plane handling unit 320 connected to the wireless base station apparatus 200 belong to the same gateway apparatus 300 in the explained example, alternatively, the control-plane handling unit and the data-plane handling unit connected to the wireless base station apparatus 200 may belong to different gateway apparatuses.

2.3 Processing in Mobile Communication System

The processing performed in the mobile communication system according to the present embodiment is explained below.

2.3.1 Processing Performed by Base Station for Call Control

The processing performed by a wireless base station apparatus according to the present embodiment for controlling connection of a data transmission path is explained below.

Figure 4:
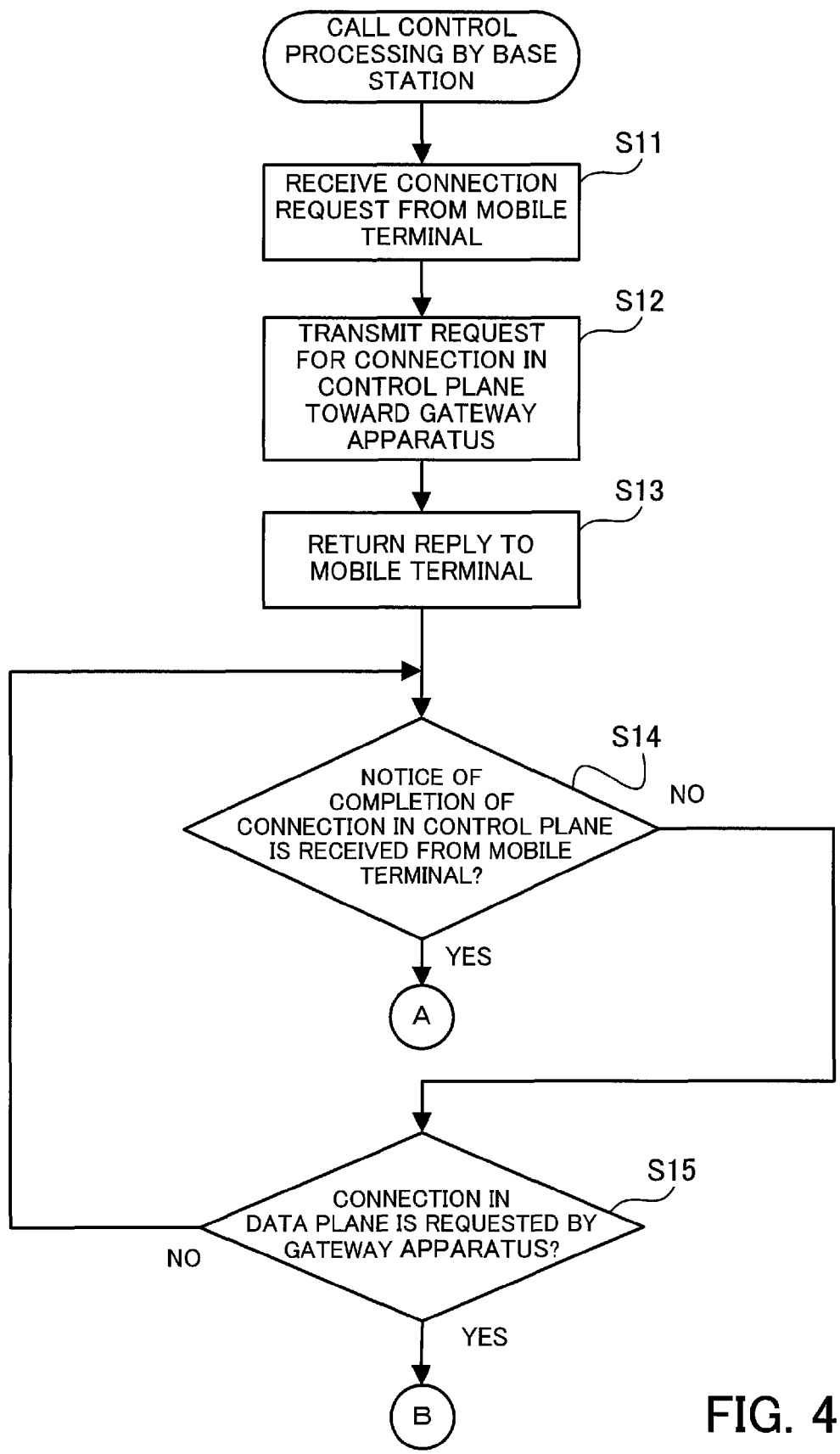
FIGS. 4, 5, and 6 indicate a flow of call control processing performed in the wireless base station apparatus.
Figure 5:
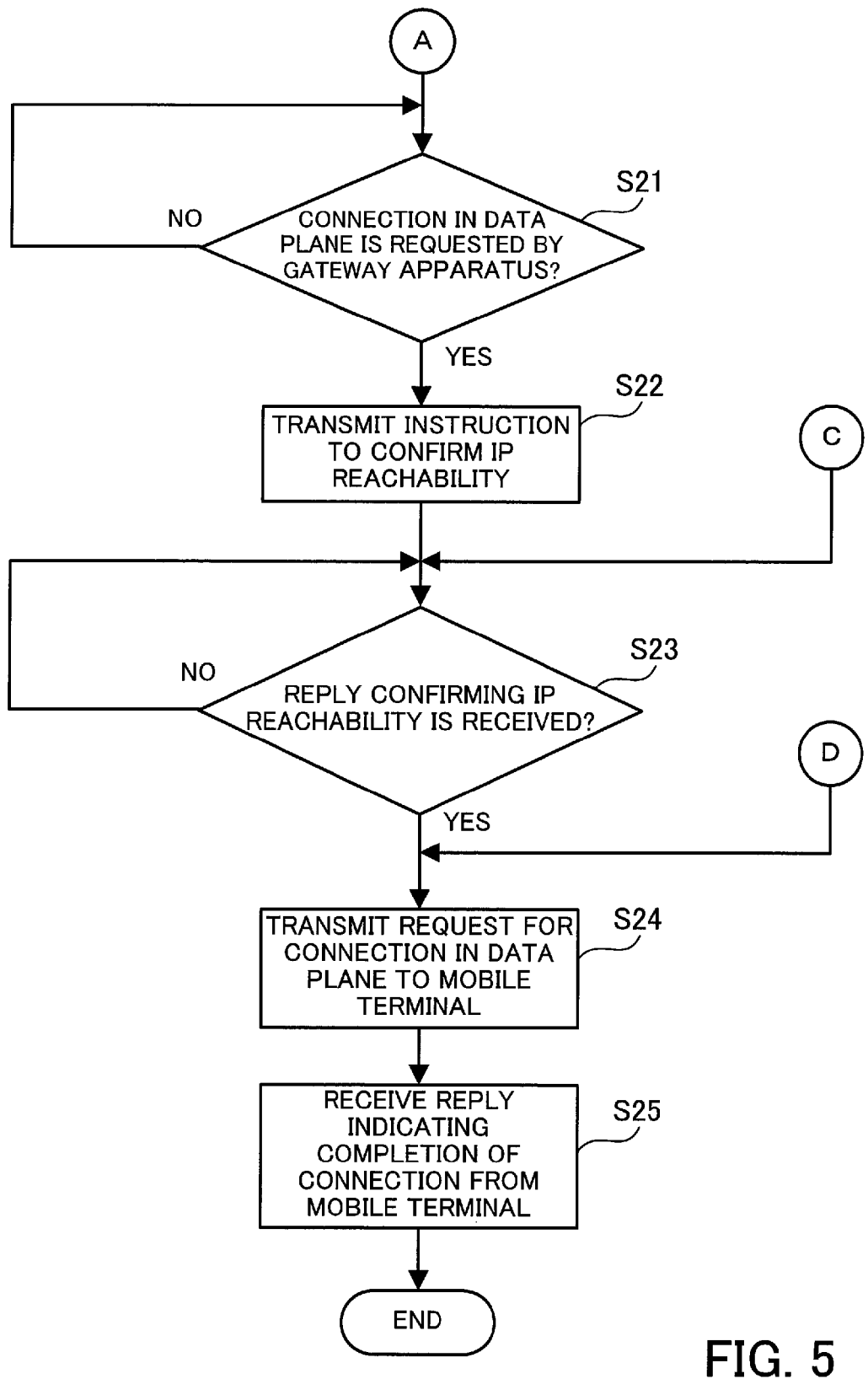
Figure 6:
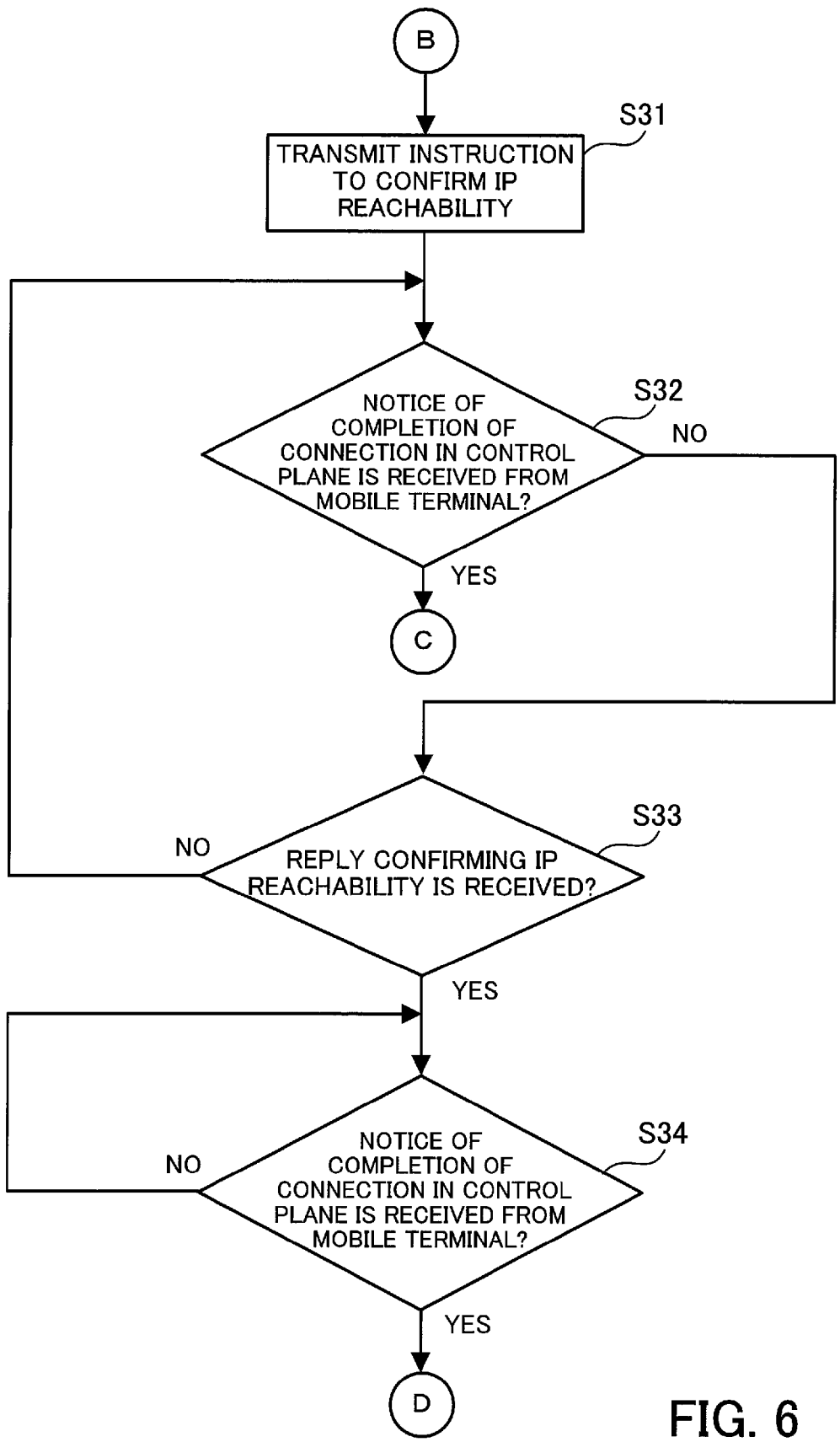

FIGS. 4, 5, and 6 indicate a flow of call control processing performed by the wireless base station apparatus 200.

On every startup, the wireless base station apparatus 200 (illustrated in FIG. 3) performs the call control processing, and waits for receipt of a connection request which is transmitted from the mobile terminal 100. When the wireless base station apparatus 200 receives a connection request from the mobile terminal 100 (in step S11), the wireless base station apparatus 200 starts the operations in the following steps S12 to S34. The connection request from the mobile terminal 100 requests establishment of connection in the data plane between the mobile terminal 100 and the opposite end of the data transmission path. The processing indicated in FIGS. 4, 5, and 6 is explained below step by step.

<Step S11> The wireless base station apparatus 200 waits for receipt of a connection request from the mobile terminal 100. When the wireless base station apparatus 200 receives a connection request, the wireless base station apparatus 200 performs the operations in steps S12 to S34.

<Step S12> The wireless base station apparatus 200 transmits toward the gateway apparatus 300 (illustrated in FIG. 3) a request for connection in the control plane.

<Step S13> The wireless base station apparatus 200 returns to the mobile terminal 100 a reply indicating the receipt of the request for connection in the control plane.

<Step S14> The wireless base station apparatus 200 determines whether or not the wireless base station apparatus 200 receives from the mobile terminal 100 a notice of completion of connection in the control plane in reply to the reply returned in step S13. When yes is determined, the operation of the wireless base station apparatus 200 goes to step S21 (indicated in FIG. 5). When no is determined, the operation of the wireless base station apparatus 200 goes to step S15.

<Step S15> The wireless base station apparatus 200 determines whether or not the wireless base station apparatus 200 receives from the gateway apparatus 300 a request for connection in the data plane in reply to the request for connection in the control plane transmitted in step S12 to the gateway apparatus 300. When yes is determined, the operation of the wireless base station apparatus 200 goes to step S31 (indicated in FIG. 6). When no is determined, the operation of the wireless base station apparatus 200 goes to step S14.

<Step S21> The wireless base station apparatus 200 determines whether or not the wireless base station apparatus 200 receives from the gateway apparatus 300 a request for connection in the data plane in reply to the request for connection in the control plane transmitted in step S12 (indicated in FIG. 4) to the gateway apparatus 300. When yes is determined, the operation of the wireless base station apparatus 200 goes to step S22. When no is determined, the wireless base station apparatus 200 repeats the operation in step S21 until the wireless base station apparatus 200 receives the request for connection in the data plane.

<Step S22> The wireless base station apparatus 200 transmits toward the gateway apparatus 300 an instruction to confirm IP reachability in the data plane established through the IP network 400 after the wireless base station apparatus 200 determines in step S21 that the wireless base station apparatus 200 receives from the gateway apparatus 300 the request for connection in the data plane.

<Step S23> The wireless base station apparatus 200 determines whether or not the wireless base station apparatus 200 receives from the gateway apparatus 300 a reply confirming the IP reachability in reply to the instruction to confirm the IP reachability transmitted in step S22 to the gateway apparatus 300. When yes is determined, the operation of the wireless base station apparatus 200 goes to step S24. When no is determined, the wireless base station apparatus 200 repeats the operation in step S23 until the wireless base station apparatus 200 receives the reply confirming the IP reachability.

<Step S24> The wireless base station apparatus 200 transmits to the mobile terminal 100 a request for connection in the data plane.

<Step S25> The wireless base station apparatus 200 confirms that the wireless base station apparatus 200 receives from the mobile terminal 100 a reply indicating completion of the connection in the data plane in reply to the request for connection in the data plane transmitted in step S24 to the mobile terminal 100, and completes the processing of FIGS. 4, 5, and 6. Thereafter, the wireless base station apparatus 200 transmits toward the gateway apparatus 300 a notice of completion of the connection in the control plane and the data plane, as explained in detail later with reference to FIG. 9. Thus, the connection in the data plane between the mobile terminal 100 and the gateway apparatus 300 is completed.

<Step S31> The wireless base station apparatus 200 transmits toward the gateway apparatus 300 an instruction to confirm IP reachability after the wireless base station apparatus 200 determines in step S15 (indicated in FIG. 4) that the wireless base station apparatus 200 receives the request for connection in the data plane.

<Step S32> The wireless base station apparatus 200 determines whether or not the wireless base station apparatus 200 receives from the mobile terminal 100 a notice of completion of connection in the control plane in reply to the reply returned in step S13 (indicated in FIG. 4). When yes is determined, the operation of the wireless base station apparatus 200 goes to step S23 (indicated in FIG. 5). When no is determined, the operation of the wireless base station apparatus 200 goes to step S33.

<Step S33> The wireless base station apparatus 200 determines whether or not the wireless base station apparatus 200 receives from the gateway apparatus 300 a reply confirming the IP reachability in reply to the instruction to confirm the IP reachability transmitted in step S31 to the gateway apparatus 300. When yes is determined, the operation of the wireless base station apparatus 200 goes to step S34. When no is determined, the operation of the wireless base station apparatus 200 goes to step S32.

<Step S34> The wireless base station apparatus 200 determines whether or not the wireless base station apparatus 200 receives from the mobile terminal 100 a notice of completion of connection in the control plane in response to the reply returned in step S13 (indicated in FIG. 4). When yes is determined, the operation of the wireless base station apparatus 200 goes to step S24 (indicated in FIG. 5). When no is determined, the wireless base station apparatus 200 repeats the operation in step S34 until the wireless base station apparatus 200 receives the notice of completion of connection in the control plane.

2.3.2 Processing Performed in System for Controlling Call

Figure 8:
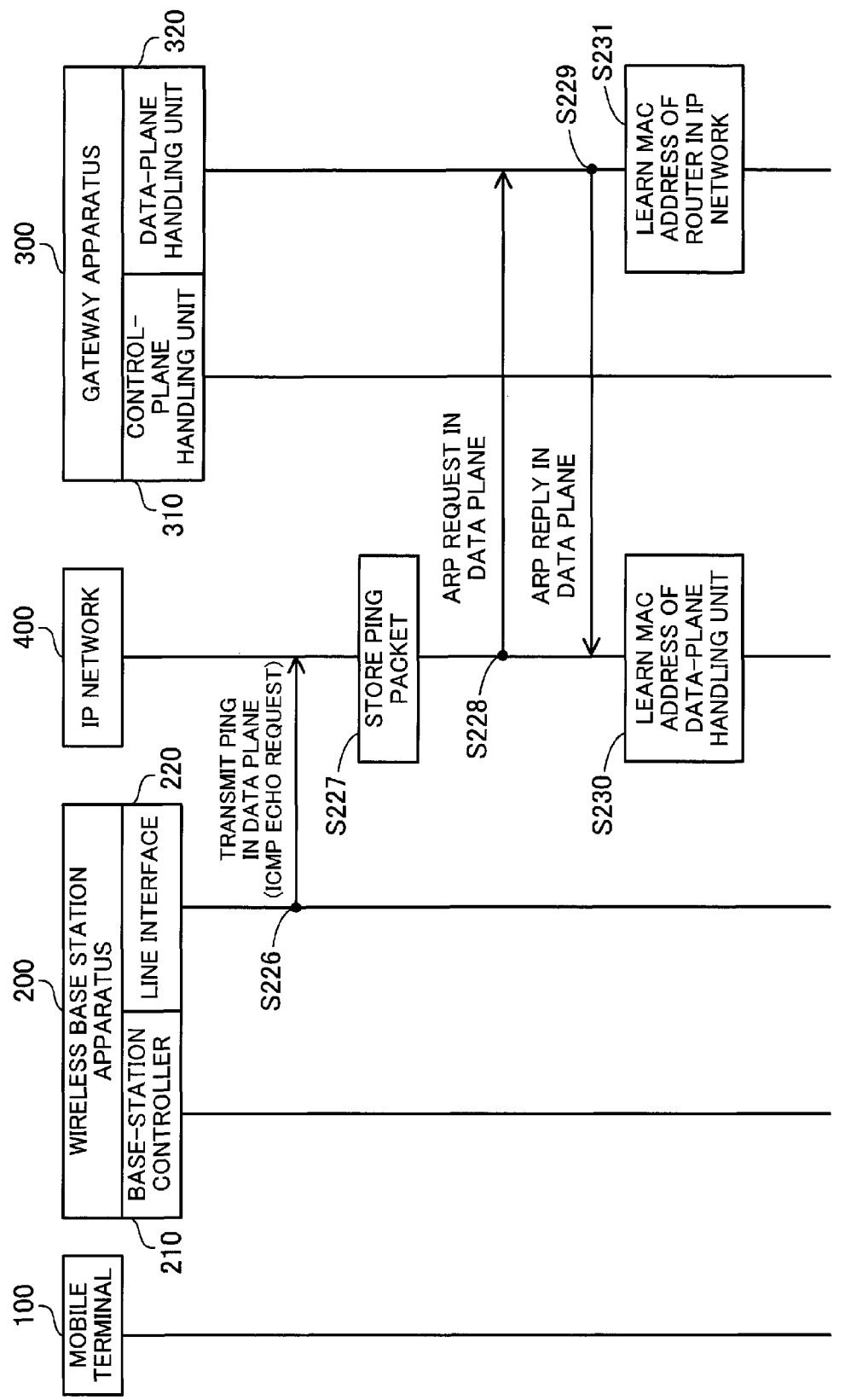
Figure 9:
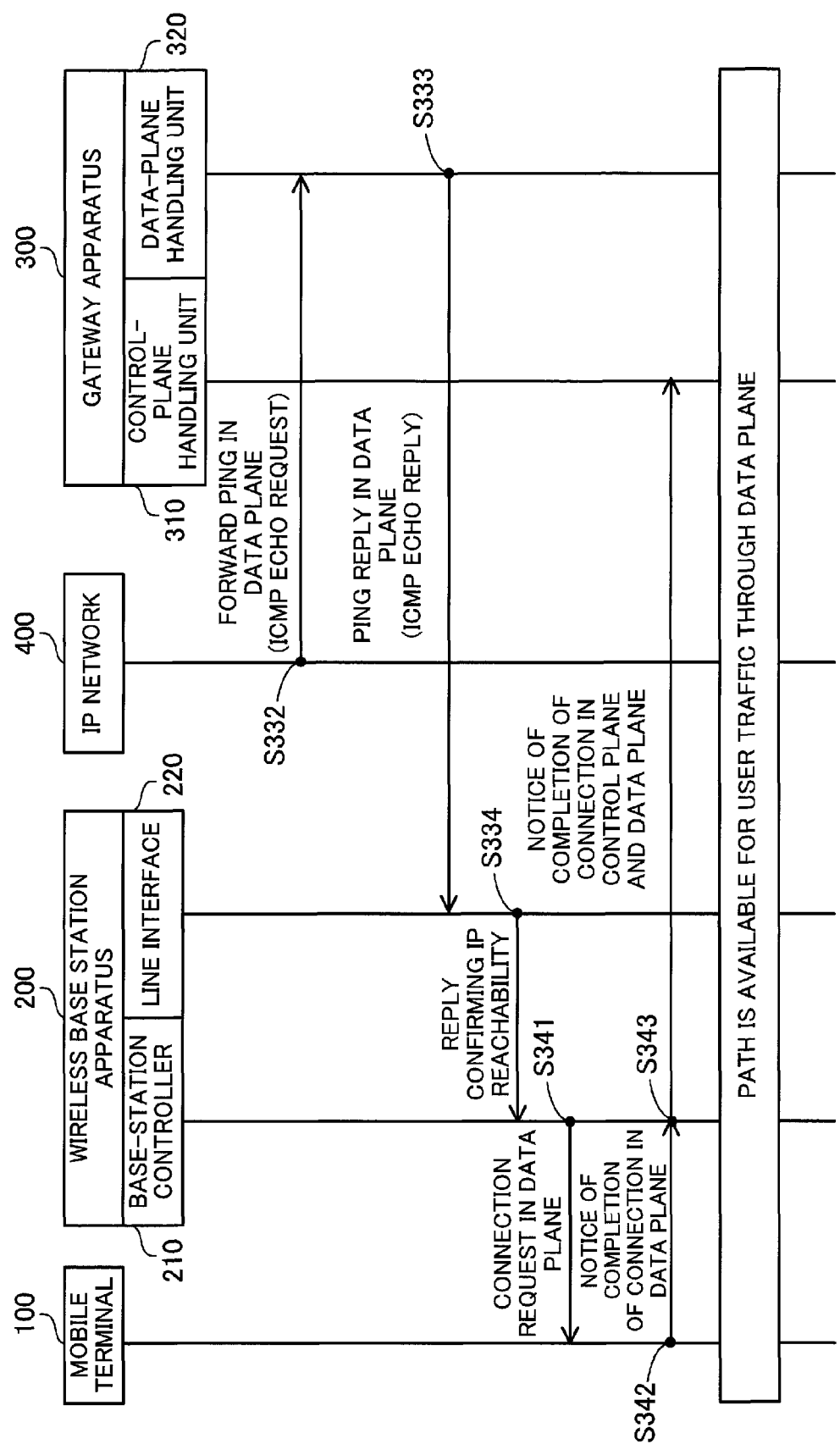

A sequence of operations performed for call control in the system according to the embodiment is explained below. FIGS. 7, 8, and 9 indicate the sequence of operations performed for call control in the system according to the embodiment.

In the mobile communication system according to the present embodiment, when the wireless base station apparatus 200 receives from the mobile terminal 100 a request for connection of a call, the wireless base station apparatus 200 performs the processing of FIGS. 4 to 6, so that the base-station controller 210 and the line interface 220 in the wireless base station apparatus 200 and the control-plane handling unit 310 and the data-plane handling unit 320 in the gateway apparatus 300 cooperate to perform data communication between the mobile terminal 100 and the gateway apparatus 300. Hereinbelow, a sequence of operations which are performed until the call is connected and the data plane is established between the wireless base station apparatus 200 and the gateway apparatus 300 are explained with reference to FIGS. 7, 8, and 9.

<Step S101> The mobile terminal 100 transmits to the base-station controller 210 a request for connection of a call in order to start data communication through the gateway apparatus 300. Then, the request for connection of a call is transmitted from the base-station controller 210 toward the control-plane handling unit 310 through the IP network 400. (In the following steps, the requests, replies, notices, and instructions from the mobile terminal 100 are also similarly transmitted.)

<Step S102> When the base-station controller 210 receives from the mobile terminal 100 the request for connection of a call in step S101, the base-station controller 210 transmits the request for connection of a call toward the control-plane handling unit 310.

<Step S103> When the control-plane handling unit 310 receives from the base-station controller 210 the request for connection of a call, the control-plane handling unit 310 transmits toward the base-station controller 210 a request for connection in the data plane. The request for connection in the data plane contains the IP address of the data-plane handling unit 320. Therefore, the base-station controller 210 can acquire the IP address of the data-plane handling unit 320. In addition, the request for connection in the data plane also plays a roll of a reply to the request for connection of a call transmitted from the base-station controller 210 in step S102. The request for connection in the data plane notifies the base-station controller 210 that the control plane can be established between the base-station controller 210 and the control-plane handling unit 310.

<Step S111> When the base-station controller 210 receives from the control-plane handling unit 310 the request for connection in the data plane, the base-station controller 210 transmits to the mobile terminal 100 a reply to the request for connection of a call received in step S101. This reply notifies the mobile terminal 100 that the control plane can be established between the mobile terminal 100 and the control-plane handling unit 310.

<Step S112> When the mobile terminal 100 receives the reply transmitted from the base-station controller 210 in step S111, the mobile terminal 100 transmits to the base-station controller 210 a notice of completion of connection in the control plane (i.e., a notice of establishment of the control plane) between the mobile terminal 100 and the control-plane handling unit 310.

<Step S121> When the base-station controller 210 receives from the control-plane handling unit 310 the request for connection in the data plane, the base-station controller 210 sends to the line interface 220 an instruction to confirm IP reachability (i.e., an instruction to transmit a request for confirmation of reachability through the IP network 400). The operation in step S121 is performed in parallel to the operation in step S111.

That is, the base-station controller 210 instructs the line interface 220 to confirm IP reachability when the base-station controller 210 acquires the IP address of the data-plane handling unit 320 in the gateway apparatus 300 before completion of connection in the data plane. Therefore, the operation for confirmation of IP reachability is started in an early stage, so that data transmission can start early after establishment of the control plane.

The operations performed in response to the instruction to confirm IP reachability in the mobile communication system according to the present embodiment are briefly indicated in steps S122 to S125 in FIG. 7 and FIGS. 8 and 9, and are explained in detail later with reference to FIGS. 10 to 12. In the following explanations with reference to FIGS. 7, 8, and 9, for simple illustration, it is assumed that the data plane is established by use of only one router. However, a case where the data plane is established by use of more than one router is explained later with reference to FIGS. 10 to 12.

<Step S122> The line interface 220 transmits a data-plane ARP request on receipt of the instruction to confirm IP reachability which is sent from the base-station controller 210.

<Step S123> When a router (not illustrated) in the IP network 400 receives the data-plane ARP request, the router transmits to the line interface 220 a data-plane ARP reply in reply to the data-plane ARP request.

<Step S124> The line interface 220 performs learning of the MAC address of the router, i.e., the line interface 220 stores the MAC address of the router in a routing table, where the MAC address of the router is acquired from the data-plane ARP reply received in step S123.

<Step S125> The router performs learning of the MAC address of the line interface 220, i.e., the router stores the MAC address of the line interface 220 in a routing table, where the MAC address of the line interface 220 is acquired from the data-plane ARP request received in step S122.

<Step S226> The line interface 220 performs ping transmission to the router through the data plane. Specifically, the line interface 220 transmits to the router an ICMP echo request on the basis of the MAC address of the router acquired from the data-plane ARP reply received in step S123 (in FIG. 7).

At this time, the IP address of the data-plane handling unit 320 contained in the request for connection in the data plane received from the control-plane handling unit 310 in step S103 (in FIG. 7) is set in the ICMP echo request, so that the ICMP echo request can be forwarded through the IP network 400 on the basis of the IP address of the data-plane handling unit 320, and reach the data-plane handling unit 320.

<Step S227> When the router receives the ICMP echo request transmitted from the line interface 220 in step S226, the router stores the received ICMP echo request (ping packet).

<Step S228> The router transmits to the data-plane handling unit 320 a data-plane ARP request on receipt of the ICMP echo request transmitted from the line interface 220 in step S226.

<Step S229> When the data-plane handling unit 320 receives the data-plane ARP request, the data-plane handling unit 320 returns to the router a data-plane ARP reply.

<Step S230> The router performs learning of the MAC address of the data-plane handling unit 320, i.e., the router stores the MAC address of the data-plane handling unit 320 in the routing table, where the MAC address of the data-plane handling unit 320 is acquired from the data-plane ARP reply transmitted in step S229.

<Step S231> The data-plane handling unit 320 performs learning of the MAC address of the router, i.e., the data-plane handling unit 320 stores the MAC address of the router in a routing table, where the MAC address of the router is acquired from the data-plane ARP request received in step S228.

<Step S332> The router forwards the ping packet in the data plane, i.e., the router forwards the ping packet received from the line interface 220, to the data-plane handling unit 320. Specifically, the router forwards the ICMP echo request received from the line interface 220 and stored in the router, to the data-plane handling unit 320 by using the MAC address of the data-plane handling unit 320 acquired from the data-plane ARP reply transmitted from the data-plane handling unit 320 in step S229 (of FIG. 8).

<Step S333> The data-plane handling unit 320 returns to the line interface 220 a ping reply in the data plane in reply to the ping packet forwarded to the data-plane handling unit 320 in step S332. Specifically, the data-plane handling unit 320 transmits an ICMP echo reply to the line interface 220 by using the MAC address of the line interface 220 acquired from the ICMP echo request transmitted from the router in step S332.

Figure 7:
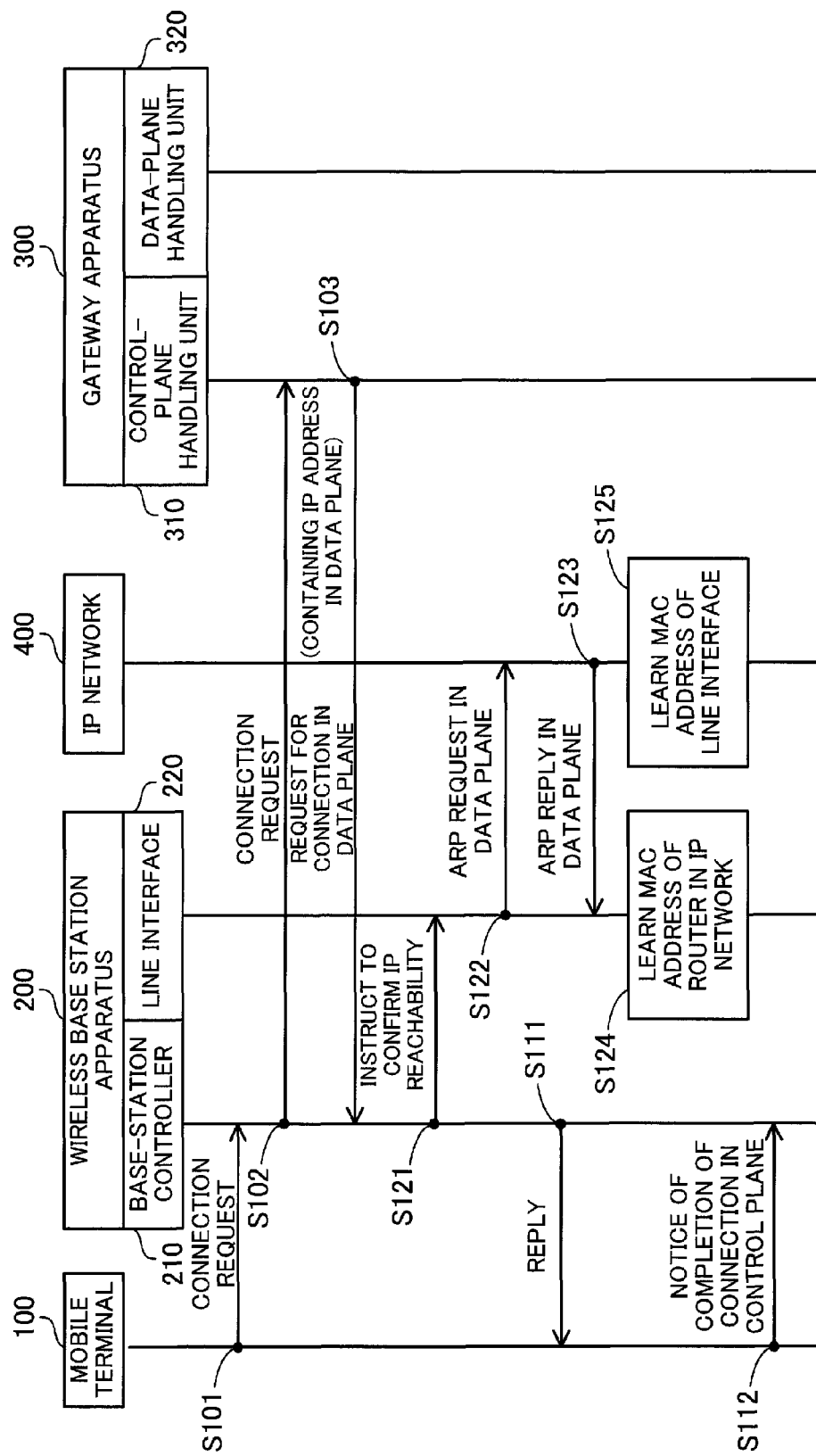
FIGS. 7, 8, and 9 indicate a sequence of operations performed for call control in the system according to the embodiment.

<Step S334> When the line interface 220 receives the ping reply transmitted from the data-plane handling unit 320 in the data plane, the line interface 220 sends to the base-station controller 210 a reply confirming IP reachability in reply to the instruction to confirm IP reachability transmitted in step S121 (indicated in FIG. 7). When the base-station controller 210 receives the reply confirming IP reachability, the base-station controller 210 can confirm that the data plane can be established between the line interface 220 and the data-plane handling unit 320.

<Step S341> When the base-station controller 210 receives all of the request for connection in the data plane (from the control-plane handling unit 310 in step S103 (indicated in FIG. 7)), the notice of completion of connection in the control plane (from the mobile terminal 100 in step S112 (indicated in FIG. 7)), and the reply confirming IP reachability (from the line interface 220 in step S334), the base-station controller 210 transmits to the mobile terminal 100 a request for connection in the data plane.

<Step S342> When the mobile terminal 100 receives from the base-station controller 210 the request for connection in the data plane transmitted in step S341, the mobile terminal 100 transmits to the base-station controller 210 a notice of completion of connection in the data plane.

<Step S343> When the base-station controller 210 receives from the mobile terminal 100 the notice of completion of connection in the data plane transmitted in step S342, the base-station controller 210 transmits toward the control-plane handling unit 310 a notice of completion of connection in both of the control plane and the data plane. When the control-plane handling unit 310 receives the notice of completion of connection in both of the control plane and the data plane, the control-plane handling unit 310 can confirm the IP reachability. Thereafter, when normal completion of the IP reachability confirmation is confirmed by the base-station controller 210, the data plane is actually connected. That is, the establishment of the control plane and the data plane realizes an available path for user traffic, so that data communication between the mobile terminal 100 and the gateway apparatus 300 is enabled.

Further, in order to improve the quality and connectivity in the IP reachability confirmation, the ping packet to be transmitted may be provided with a protection step count for repeating a synchronization pattern a plural number of times in the ping packet, and repeatedly detecting synchronization of the transmitted packet a plural number of times until the synchronization pattern of the ping packet is detected. Alternatively, the transmission of the ping packet may be retried.

2.3.3 Details of IP Reachability Confirmation

Hereinbelow, details of the processing for confirming IP reachability performed in the mobile communication system according to the present embodiment and the MAC address learning performed during the processing for confirming IP reachability are explained with reference to FIGS. 10, 11, and 12.

First, the IP addresses and MAC addresses assigned to and set in the respective nodes in the mobile communication system according to the present embodiment during the processing for confirming IP reachability are summarized for explanation in an address table in FIG. 10. The IP addresses and MAC addresses indicated in the address table of FIG. 10 are referred to later in the explanations on the processing for confirming IP reachability with reference to FIGS. 11 and 12.

The address table of FIG. 10 has the column "Name of Node," the column "IP Address," and the column "MAC Address." The name of each node is indicated in the column "Name of Node," the IP address or IP addresses assigned to each node are indicated in the column "IP Address," and the MAC address or MAC addresses assigned to each node are indicated in the column "MAC Address."

Figure 11:
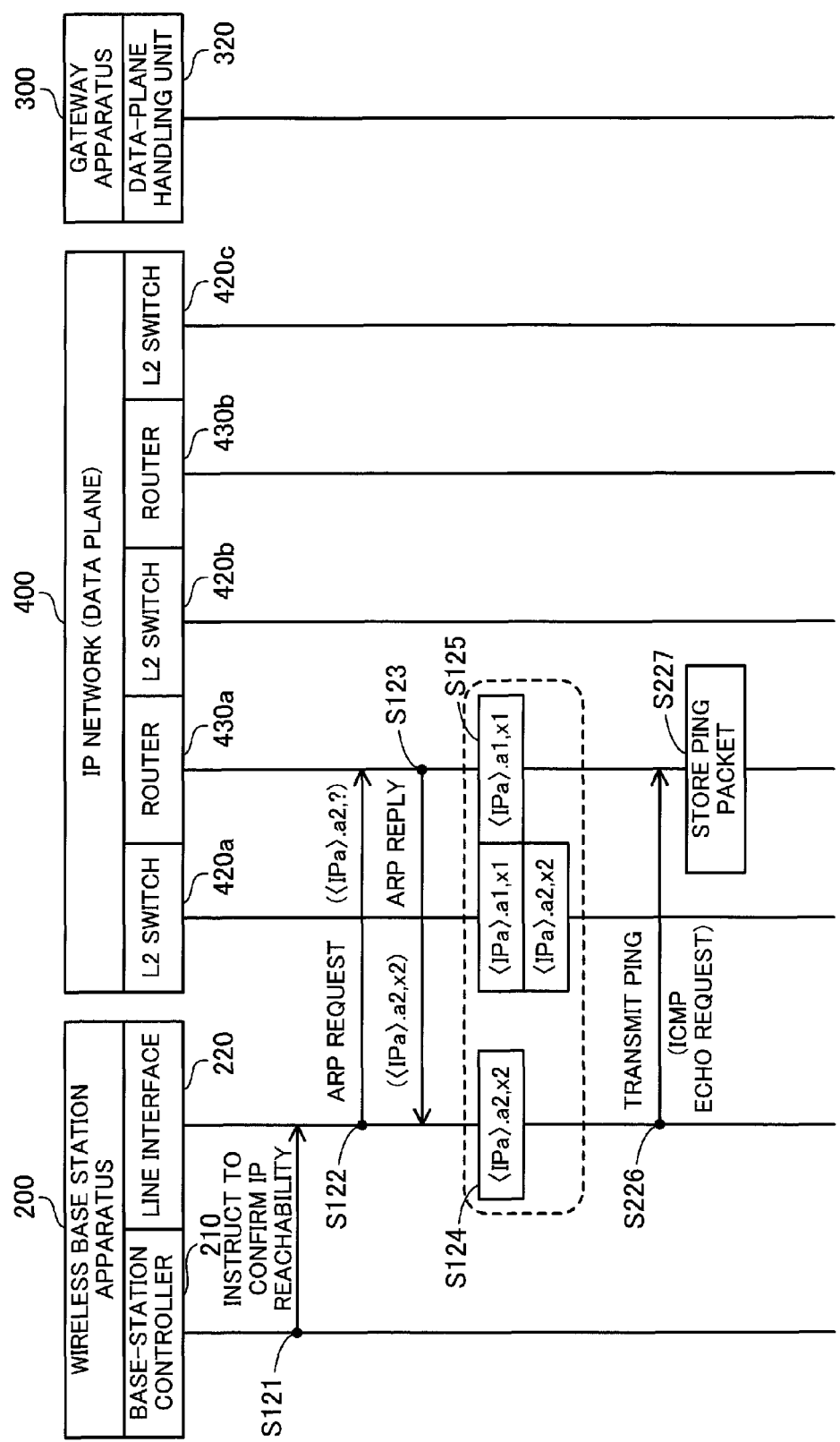
FIGS. 11 and 12 indicate a sequence of operations for confirming IP reachability including MAC address learning.
Figure 12:
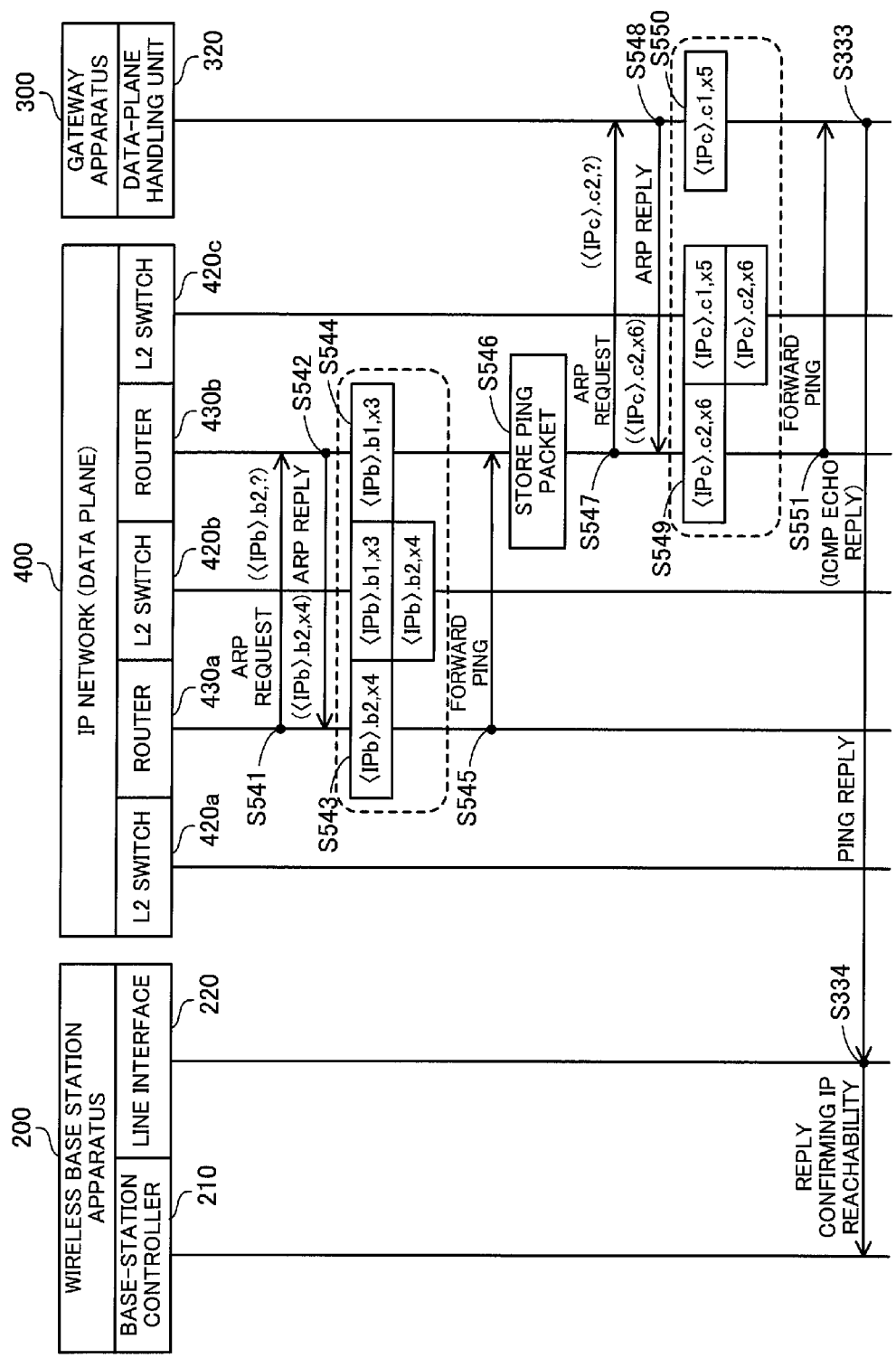

The "Wireless-base-station Device," "Router A," "Router B," and "Gateway Device" in the address table of FIG. 10 respectively indicate the wireless base station apparatus 200, router 430a, the router 430b, and the gateway apparatus 300 in the explanations with reference to FIGS. 11 and 12.

The IP address and the MAC address indicated for the wireless base station apparatus in the address table of FIG. 10 are only the IP address and the MAC address of the line interface 220, which performs communication through the IP network 400 for the processing for confirming IP reachability as explained later with reference to FIG. 11. In addition, the IP address and the MAC address indicated for the gateway apparatus in the address table of FIG. 10 are only the IP address and the MAC address of the data-plane handling unit 320, which performs communication through the IP network 400 for the processing for confirming IP reachability as explained later with reference to FIG. 11.

The IP address and the MAC address indicated in the upper row for each of the routers A and B are the IP address and the MAC address on the side connected to the wireless base station apparatus 200 (i.e., the wireless base station apparatus side), and the IP address and the MAC address indicated in the lower row for each of the routers A and B are the IP address and the MAC address on the side connected to the gateway apparatus 300 (i.e., the gateway apparatus side).

Next, details of the processing for confirming IP reachability performed in the mobile communication system according to the present embodiment are explained below with reference to FIGS. 11 and 12, which indicate a sequence of operations for confirming IP reachability including the MAC address learning. As explained before with reference to FIGS. 7 to 9, the processing for confirming IP reachability is performed during the processing for establishing the control plane and the data plane in the mobile communication system according to the present embodiment, and is initiated by the instruction to confirm IP reachability. The main part of the processing for confirming IP reachability is the MAC address learning, in which the respective nodes learn the MAC addresses.

In the explanations with reference to FIGS. 11 and 12, it is assumed that the wireless base station apparatus 200 and the gateway apparatus 300 are connected through the IP network 400. In FIGS. 11 and 12, only the nodes related to the MAC address learning are indicated. The operations in FIGS. 11 and 12 corresponding to the operations in FIGS. 7 to 9 respectively bear the same step numbers as the operations in FIGS. 7 to 9.

As explained before, the wireless base station apparatus 200 comprises the base-station controller 210 and the line interface 220, and the gateway apparatus 300 comprises the data-plane handling unit 320. (The control-plane handling unit 310 is not illustrated and is not referred to in the explanations with reference to FIGS. 11 and 12.) In addition, it is assumed that the IP network 400 comprises the L2 switches 420a, 420b, and 420c and the routers 430a and 430b, and the L2 switches and the routers are alternately arranged as indicated in FIGS. 11 and 12.

<Step S121> The base-station controller 210 sends to the line interface 220 an instruction to confirm IP reachability.

<Step S122> In order to acquire the MAC address of the router 430a (which is initially unknown), the line interface 220 transmits an ARP request in which the IP address "<IPa>.a2" of the router 430a is set as the destination address. In addition, the IP address "<IPa>.a1" and the MAC address "x1" of the line interface 220 are set in the ARP request.

<Step S123> When the router 430a receives the ARP request from the line interface 220, the router 430a transmits an ARP reply containing the IP address "<IPa>.a2" and the MAC address "x2" of the router 430a on the wireless base station apparatus side.

<Step S124> When the line interface 220 receives the ARP reply transmitted from the router 430a in step S123, the line interface 220 stores in the routing table the IP address "<IPa>.a2" and the MAC address "x2" of the router 430a on the wireless base station apparatus side which are contained in the received ARP reply.

<Step S125> When the router 430a receives the ARP request transmitted from the line interface 220 in step S122, the router 430a stores in a routing table the IP address "<IPa>.a1" and the MAC address "x1" of the line interface 220 which are contained in the received ARP request.

At this time, the L2 switch 420a, which connects the line interface 220 and the router 430a, performs MAC address learning. That is, the L2 switch 420a stores in a MAC table the MAC address "x1" of the line interface 220 and the MAC address "x2" of the router 430a on the wireless base station apparatus side. In addition, at this time, the L2 switch 420a may also learn the IP address "<IPa>.a1" of the line interface 220 and the IP address "<IPa>.a2" of the router 430a on the wireless base station apparatus side.

<Step S226> The line interface 220 performs ping transmission. That is, the line interface 220 transmits an ICMP echo request to the router 430a by using the MAC address "x2" of the router 430a on the wireless base station apparatus side which is learned in step S124.

At this time, the ICMP echo request contains the IP address "<IPa>.c2" of the data-plane handling unit 320 which is acquired from the request for connection in the data plane (transmitted from the control-plane handling unit 310 in step S103 as indicated in FIG. 7). Thus, the ICMP echo request can reach the data-plane handling unit 320 by being repeatedly forwarded through the IP network 400 on the basis of the IP address "<IPa>.c2" of the data-plane handling unit 320 contained in the ICMP echo request.

In addition, the ICMP echo request contains the IP address "<IPa>.a1" of the line interface 220 as the source of the ICMP echo request. Therefore, the ICMP echo reply, which is subsequently transmitted from the data-plane handling unit 320 toward the line interface 220 in reply to the ICMP echo request, can contain the IP address "<IPa>.a1" of the line interface 220, and can be therefore repeatedly forwarded through the IP network 400 to the line interface 220 on the basis of the IP address "<IPa>.a1" of the line interface 220.

<Step S227> When the router 430a receives the ICMP echo request transmitted from the line interface 220 in step S226, the router 430a stores the received ICMP echo request (i.e., the ping packet).

<Step S541> In order to acquire the MAC address of the router 430b (which is initially unknown), the router 430a transmits an ARP request in which the IP address "<IPb>.b2" of the router 430b is set as the destination address. In addition, the IP address "<IPb>.b1" and the MAC address "x3" of the router 430a on the gateway apparatus side are set in the ARP request transmitted from the router 430a.

<Step S542> When the router 430b receives the ARP request from the router 430a, the router 430b transmits an ARP reply containing the IP address "<IPb>.b2" and the MAC address "x4" of the router 430b on the wireless base station apparatus side.

<Step S543> When the router 430a receives the ARP reply transmitted from the router 430b in step S542, the router 430a stores in the routing table the IP address "<IPb>.b2" and the MAC address "x4" of the router 430b on the wireless base station apparatus side which are contained in the received ARP reply.

<Step S544> When the router 430b receives the ARP request transmitted from the router 430a in step S541, the router 430b stores in a routing table the IP address "<IPb>.b1" and the MAC address "x3" of the router 430a on the gateway apparatus side which are contained in the received ARP request.

At this time, the L2 switch 420b, which connects the routers 430a and 430b, performs MAC address learning. That is, the L2 switch 420b stores in a MAC table the MAC address "x3" of the router 430a on the gateway apparatus side and the MAC address "x4" of the router 430b on the wireless base station apparatus side. In addition, at this time, the L2 switch 420b may also learn the IP address "<IPb>.b1" of the router 430a on the gateway apparatus side and the IP address "<IPb>.b2" of the router 430b on the wireless base station apparatus side.

<Step S545> The router 430a performs ping forwarding. That is, the router 430a forwards to the router 430b the ICMP echo request (which is stored in step S227 (indicated in FIG. 11)) by using the MAC address "x4" of the router 430b on the wireless base station apparatus side which is learned in step S543.

<Step S546> When the router 430b receives from the router 430a the ICMP echo request transmitted in step S545, the router 430b stores the received ICMP echo request (i.e., the ping packet).

<Step S547> In order to acquire the MAC address of the data-plane handling unit 320 (which is initially unknown), the router 430b transmits an ARP request in which the IP address "<IPc>.c2" of the data-plane handling unit 320 is set as the destination address. In addition, the IP address "<IPc>.c1" and the MAC address "x5" of the router 430b on the gateway apparatus side are set in the ARP request transmitted from the router 430b.

<Step S548> When the data-plane handling unit 320 receives the ARP request from the router 430b, the data-plane handling unit 320 transmits an ARP reply containing the IP address "<IPb>.c2" and the MAC address "x6" of the data-plane handling unit 320.

<Step S549> When the router 430b receives from the data-plane handling unit 320 the ARP reply transmitted in step S548, the router 430b stores in the routing table the IP address "<IPb>.c2" and the MAC address "x6" of the data-plane handling unit 320 which are contained in the received ARP reply.

<Step S550> When the data-plane handling unit 320 receives the ARP request transmitted from the router 430b in step S547, the data-plane handling unit 320 stores in the routing table the IP address "<IPc>.c1" and the MAC address "x5" of the router 430b on the gateway apparatus side which are contained in the received ARP request.

At this time, the L2 switch 420c, which connects the router 430b and the data-plane handling unit 320, performs MAC address learning. That is, the L2 switch 420c stores in a MAC table the MAC address "x5" of the router 430b on the gateway apparatus side and the MAC address "x6" of the data-plane handling unit 320. In addition, at this time, the L2 switch 420c may also learn the IP address "<IPc>.c1" of the router 430b on the gateway apparatus side and the IP address "<IPc>.c2" of the data-plane handling unit 320.

<Step S551> The router 430b performs ping forwarding. That is, the router 430b forwards to the data-plane handling unit 320 the ICMP echo request (which is stored in step S546) by using the MAC address "x6" of the data-plane handling unit 320 which is learned in step S549.

<Step S333> The data-plane handling unit 320 transmits a ping reply (i.e., an ICMP echo reply) in reply to the ICMP echo request forwarded to the data-plane handling unit 320 in step S551. Specifically, the data-plane handling unit 320 transmits an ICMP echo reply toward the line interface 220 by using the IP address "<IPa>.a1" of the line interface 220 acquired from the ICMP echo request forwarded to the data-plane handling unit 320 in step S551.

3. Advantages and Additional Matters

As explained above, according to the present embodiment, the operation for the MAC address resolution (in the data plane through which data communication between the wireless base station apparatus 200 and the gateway apparatus 300 is performed) is started in advance of the establishment of the control plane before completion of call connection. Therefore, it is possible to prevent loss or delay in transmission of packets and avoid flooding of packets, although the delay, loss, or flooding of packets can be caused by the MAC address resolution in the data plane immediately after call connection in the conventional communication systems. Thus, the user traffic in the mobile terminal 100 immediately after connection of the data plane can be stabilized.

More generally, in the disclosed communication apparatus or the disclosed communication method, the operation for MAC address resolution in a data communication path (through which data communication between opposite communication apparatuses is performed) is started before completion of call connection. Therefore, it is possible to stabilize the user traffic in the data communication path immediately after call connection.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that various changes, substitutions and alterations could be made hereto without departing from the spirit and scope of the invention.

What is claimed is:

1. A wireless base station apparatus performing data communication through a network including a relay apparatus which relays data, the wireless base station apparatus performing a procedure comprising:
    establishing a data-communication path between the communication apparatus and an opposite end of the data-communication path;
    establishing a control-information path between the communication apparatus and an opposite end of the control-information path, where the control-information path is arranged for transmitting control information for controlling the data communication through the data-communication path; and
    transmitting an address-set instruction instructing the relay apparatus to search for a next-hop node in the data-communication path and store a MAC address of the next-hop node before the control-information path is established.

2. The wireless base station apparatus according to claim 1, wherein the wireless base station apparatus transmits as the address-set instruction a request for confirmation of reachability to the opposite end of the data-communication path.

3. The wireless base station apparatus according to claim 1, wherein:
    the wireless base station apparatus transmits a request to establish the control-information path between the communication apparatus and the opposite end of the control-information path; and
    the wireless base station apparatus transmits the address-set instruction to the opposite end of the data-communication path before the control-information path is established on the basis of the request to establish the control-information path.

4. The wireless base station apparatus according to claim 1, wherein:
    the wireless base station apparatus establishes the control-information path on receipt of a request to establish the control-information path transmitted from the opposite end of the control-information path; and the wireless base station apparatus transmits the address-set instruction to the opposite end of the data-communication path before the control-information path is established after the request to establish the control-information path is received.

5. The wireless base station apparatus according to claim 1, wherein the wireless base station apparatus establishes the control-information path and the data-communication path concurrently.

6. The wireless base station apparatus according to claim 1, wherein the address-set instruction instructs the relay apparatus to search for the next-hop node in the data-communication path and store the MAC address of the next-hop node, and instructs the next-hop node to store a MAC address of the relay apparatus.

7. The wireless base station apparatus according to claim 1, wherein the data communication is one of mobile communication, real-time communication, and IP telecommunication.

8. A communication method performing data communication through a network having a relay apparatus which relays data, comprising:

establishing a data-communication path between the communication apparatus and an opposite end of the data-communication path;

establishing a control-information path between the communication apparatus and an opposite end of the control-information path, where the control-information path is arranged for transmitting control information for controlling the data communication through the data-communication path; and transmitting an address-set instruction which instructs the relay apparatus to search for a next-hop node in the data-communication path and store a MAC address of the next-hop node before the control-information path is established.

* * * * *